(12) United States Patent
Sanghera et al.

(10) Patent No.: US 7,173,367 B2
(45) Date of Patent: Feb. 6, 2007

(54) COATED NON-OXIDE CATHODOLUMINESCENT PHOSPHORS, FILMS THEREOF AND FIELD EMISSION DEVICES THEREWITH

(75) Inventors: Jasbinder S. Sanghera, Greenbelt, MD (US); Ishwar D. Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1128 days.

(21) Appl. No.: 09/755,375

(22) Filed: Jan. 5, 2001

(65) Prior Publication Data

US 2001/0008363 A1    Jul. 19, 2001

Related U.S. Application Data

(63) Continuation-in-part of application No. 09/144,105, filed on Aug. 31, 1998, now abandoned.

(51) Int. Cl.
*H01J 1/62* (2006.01)
(52) U.S. Cl. .................................... 313/496
(58) Field of Classification Search ............... 313/309, 313/336, 351, 422, 467, 486–487, 495–497, 313/503, 582, 584
See application file for complete search history.

(56) References Cited

U.S. PATENT DOCUMENTS 5,747,100 A * 5/1998 Petersen ...................... 427/64
5,821,685 A * 10/1998 Peterson ..................... 313/467
6,180,029 B1 * 1/2001 Hampden-Smith et al. ...... 252/301.4 R

* cited by examiner

*Primary Examiner*—Eric S. McCall
(74) *Attorney, Agent, or Firm*—George A. Kap; John J. Karasek

(57) ABSTRACT

This invention is directed to phosphor particles and to field emission displays using the particles, each of the particles is coated with an electrically conducting material to impart to the particles environmental stability, stability under use conditions, and reduced charging.

20 Claims, 6 Drawing Sheets

COATED NON-OXIDE CATHODOLUMINESCENT PHOSPHORS, FILMS THEREOF AND FIELD EMISSION DEVICES THEREWITH

REFERENCE TO RELATED APPLICATION

This is a continuation-in-part of application entitled "Coated Cathodoluminescent Phosphors" filed Aug. 31, 1998 now abandoned bearing application Ser. No. 09/144,105.

BACKGROUND OF THE INVENTION

1. Field of the Invention

This invention pertains to the field of cathodoluminescent phosphors used in display technologies.

2. Description of Related Art

Displays are the visual interface between users and the information that the users seek. Flat panel displays are thin and lightweight. Some commercial applications of flat panel displays include laptop computers, avionic displays, automobile dashboards, navigation displays, video phones, medical systems, pocket notepads, and miniature displays. Defense applications include wall-size command control displays, avionic displays, navigational displays, and head-mounted displays for soldiers.

The desired flat panel displays are lightweight, have good brightness, have sharp contrast, colors, and have wide viewing angel. For example, displays used by soldiers on the battlefield should be able to withstand harsh environmental conditions, should be lightweight, should provide a wide viewing angle, should provide viewing in bright light, and have high resolution.

Various display technologies exist or are under development for flat panel displays. These light emitting displays include active matrix liquid crystal displays, electroluminescent displays, plasma displays, and field emission displays. Each technology has its own merits and demerits and finds applications in various niche areas.

Flat panel field emission displays contain millions of micro-sized field emitters arranged in a matrix. These field emitters are addressed, in a matrix address, a pixel row at a time. The emitted electrons are accelerated toward the pixels on a screen a few millimeters away by an accelerating voltage. Each pixel is addressed by a large number of field emitters. An individual pixel consists of red, green, and blue sub-pixels. Based on the desired color from an individual pixel, the corresponding sub-pixel is addressed and its phosphor is excited producing its characteristic color.

Phosphor selection and their requirements vary based on the conditions of their use. Field emission displays work under relatively low voltage of about 500 V–10 kV and relatively high current density of about 50–100 $\mu A/cm^2$ in contrast to cathode ray tubes that operate at high voltage of about 15,000–30,000 volts and low current density. At the low accelerating voltages used in field emission displays, slow impinging electrons do not penetrate very deeply into bulk of the phosphor, further increasing the current density at the phosphor surface. If the phosphor surface is resistive, this high current density can lead to serious charging, local heating, and thermal breakdown.

Most of the commonly used phosphors in cathode ray tubes, field emission displays and electroluminescent displays are sulfides that have highly resistive surfaces and typical particle sizes in the range of 1–10 microns. Some commonly used cathode ray tube phosphors are ZnS:Ag, Cl (blue), ZnS:Cu (green), $Y_2O_3$:Eu (red), and $Y_2O_3S$ Eu (red) which are now being modified for field emission display applications. Some of the newly developed electroluminescent display phosphors, that maybe used in field emission display devices, are also sulfides: $CaGa_2S_4$:Ce (blue), $SrGa_2S_4$:Ce (blue), ZnS:Tb (green) $SrGa_2S_4$:Eu (green), CaS:Eu(red), (Ca, Sr)$Ga_2S_4$:Ce, (Ca, Sr)$Ga_2S_4$, and mixtures thereof. Under high coulomb charging, the surface temperature of resistive phosphors increases thereby resulting in dissociation and surface degradation (aging). Sulfur dioxide and hydrogen sulfide gases evolve from the phosphor surface and can damage the field emitters. Since field emission displays are addressed a line at a time, a given pixel is addressed for microseconds as opposed to nanoseconds in the case of cathode ray tubes. This long address time associated with the high current densities used in field emission displays make the conditions worse and result in severe current saturation and phosphor degradation. In many cases, aging is accelerated by heat that is associated with phosphor charging. Since the efficiency of the phosphor decreases as the accelerating voltage is decreased, the current density is increased to maintain brightness. The efficiency is further lowered by the high current densities involved in the process, surface charging and aging. Hence, the phosphors currently used in field emission displays have very poor efficiency.

Improvements in the efficiency of existing phosphors can be realized by reducing their resistivity, controlling their grain size, and modifying the surface chemistry of the phosphor particles. The efficiency of a phosphor can also be increased by using the quantum confinement effect. This is achieved by using quantum dots, i.e., <10 nm sized particles. However, the nanocrystalline quantum dot phosphors have very large surface areas that result in electron traps from impurities at the surface. The traps reduce the observed efficiency of the nanophosphors. Each individual nanocrystalline quantum dot must be isolated or prevented from agglomeration to observe quantum effect. All the problems, such as surface degradation, environmental effects, and aging, discussed in the case of microcrystalline or large phosphors, still exist in the case of nanocrystalline phosphors. These problems can be solved by using appropriate protective coatings on the phosphors used in electroluminescent displays, cathodoluminescent displays, and field emission display devices.

The Peterson U.S. Pat. No. 5,747,100 discloses a phosphor designed to emit radiation in the visible range when indirectly excited by low energy electrons, i.e. electrons which have energy in the tens of volts. Petersen's phosphor particle consists of a light-emitting particle with a UV-emitting coating. Petersen's light emitting particles are made from well known UV-excitable light emitting phosphors, which are known to emit visible light upon UV excitation and the coating is a well known UV-emitting material. The purpose of this coating is to convert the low voltage electrons into UV radiation and thereby exciting the UV phosphor particles. UV light is emitted in the spectrum of about 50–400 nm whereas visible light is emitted in the spectrum of about 400–700 nm.

For present field emission display commercial applications, phosphors operating under accelerating voltages of 100–10,000 volts, must last in excess of 10,000 hours of continuous operation without losing 50% of its original brightness. Presently, the phosphors do not meet this standard. The invention disclosed herein makes it possible for such phosphors to meet the standard.

BRIEF SUMMARY OF THE INVENTION

This invention is a phosphor particle coated with a conducting coating, which particle has improved environmental stability, improved stability under use, and reduced surface charging which has a negative effect on efficiency and useful lifetime of the phosphors. This invention involves provision of a preferably wide band gap barrier coating between the phosphor and the conducting coating. This invention is also directed to a flat panel display operating on the field emission principle using the phosphor particles described herein. This display device is expected to have greatly improved lifetime.

DETAILED DESCRIPTION OF THE INVENTION

Figure 1:
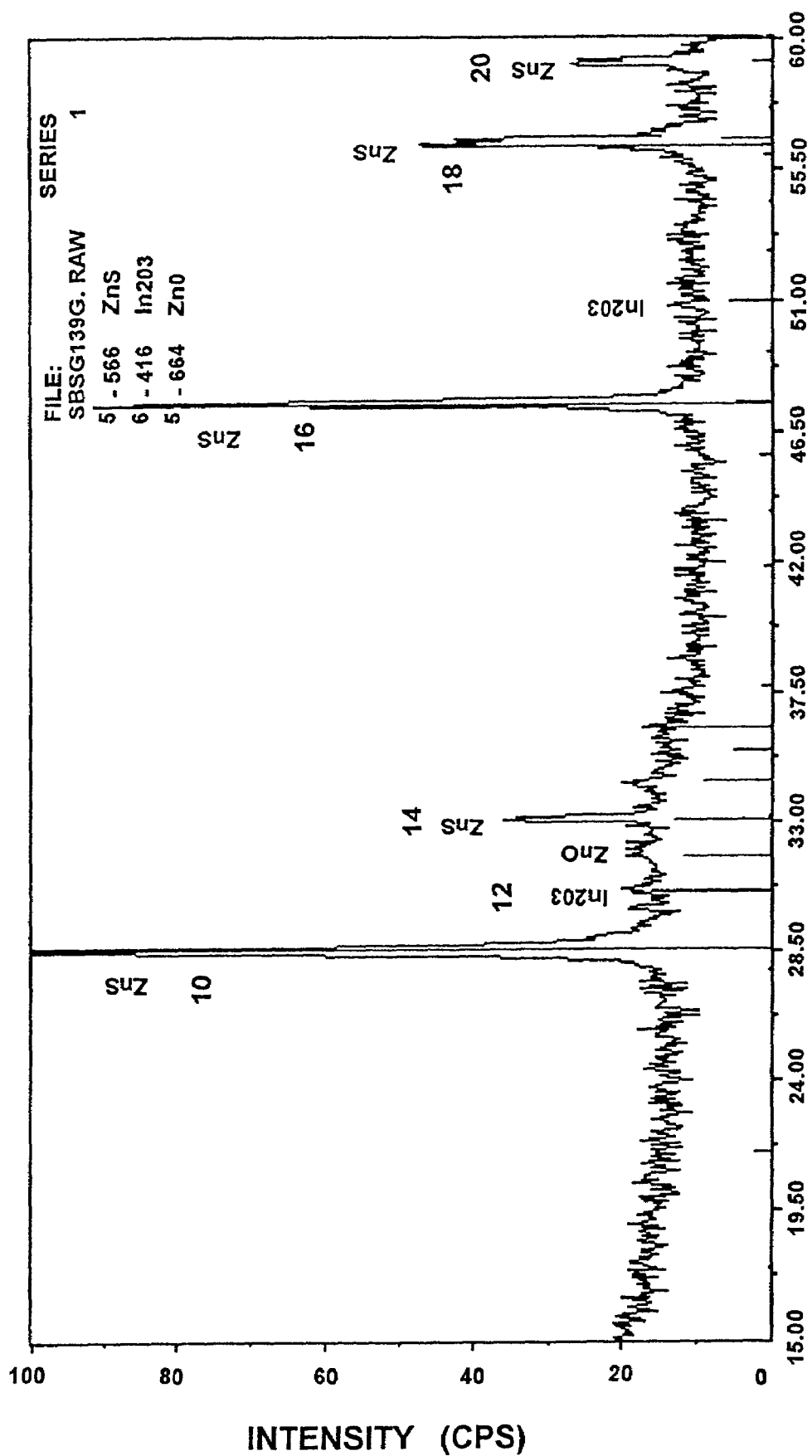
FIG. 1 shows X-ray diffraction lines from the zinc sulfide and indium tin oxide present in the coated phosphors of Ex. 1.

This invention pertains to protecting phosphors from degradation due to environmental and in service conditions.

More particularly, this invention pertains to phosphors coated with an electrically conducting coating which improves environmental stability, improves stability under use, and reduces surface charging which degrades efficiency and useful lifetime of the phosphors. This invention pertains to the phosphors in cathodoluminescent/field emission display devices wherein the phosphors are directly excited by electrons. In some cases, a barrier coating of a wide band gap material is provided between the phosphors and the conducting coatings to prevent reactions at the phosphor/coating interface.

In a typical embodiment, the invention herein pertains to particles in powder form for use as a phosphor, each particle comprising an emitting material that can emit visible light in response to direct excitation caused by electrons operating at low voltage, and an electrically conducting and visible light transmitting material disposed on said emitting material to provide an electrical pathway across the particles.

The presently used commercial phosphors have a typical size of 0.5–20 microns, more typically 1–10 microns, and are also referred to herein as "microphosphors". A conductive coating is applied to the phosphors in order to provide an electrically conducting path for the electrons that would accumulate on the surface. The coating can be metallic or nonmetallic and is applied either directly onto the surface of the phosphor or on top of a barrier coating. Examples of metallic coatings include gold, silver, palladium, zinc, indium, and aluminum. Examples of nonmetallic coatings include indium oxide, zinc oxide, tin oxide, indium tin oxide, and mixtures thereof. Although the latter coatings are nonmetallic, they nevertheless, are electrically conducting.

The coating on the phosphor particle should be thick enough to be electrically conducting but not be too thick so that it absorbs the electron beam or the light emanating from the phosphors in the visible spectrum of about 400–700 nm. Typically, thickness of the conducting coating is from about 0.5 nm to about 50 nm, more typically 1–10 nm. The conducting coating serves the purpose of providing an electrical path across the phosphor particle and should preferably be continuous or hermetic. The coating, for surface charge removal purposes, does not need to be hermetic as long as it provides a continuous electrical path.

A barrier coating can be optionally provided on the microphosphors before the conducting coating. The barrier coating can be of a wide band gap (electrically nonconducting) material and is typically 0.5–50 nm, more typically 1–10 nm thick. Examples of wide band gap materials are silica, magnesia, alumina, and mixtures thereof. The purpose of providing the optional barrier coat on microphosphors is to prevent reaction or poisoning of the conductive coatings, to improve adhesion between the phosphor and the conducting coating, and to seal the phosphor from degradation caused by moisture or anything else in the environment.

If a barrier coating is provided on a phosphor particle, as describe above, then the phosphor particle has a hybrid coating—a layer of the barrier material and a layer of a conducting material. Although separate layers are typical in a hybrid coating, it is possible to use a hybrid coating which is a mixture of the materials if there is a sufficient amount of the conducting material to provide a continuous electrical path through the hybrid coating.

As already noted, the theoretical efficiency of a phosphor can be increased by making phosphor quantum dots. Nanophosphors, which are not yet commercially available, are of a small enough size that quantum confinement is possible. The tendency to use nanophosphors in place of commercially available phosphors, or microphosphors, is influenced by the fact that microphosphors have luminescent efficiency of 1–20% whereas nanophosphors have a much higher luminescent efficiency of 50–90%. Size of the nanophosphors is typically 0.5–20 nm, more typically 1–10 nm. The nanophosphors are typically made from the same material as the commercially available phosphors. They can also be made from materials under development such as thiogallates, sulfides, oxysulfides, and halides, which have high luminescent efficiency.

Pursuant to this invention, the nanophosphors have a barrier coating on the surface of the nanophosphor particle of a wide band gap material. The barrier coating thickness is typically 0.5–50 nm, more typically 1–10 nm.

Examples of wide band gap materials include silica and alumina. Silica has a band gap of 8.4 eV and alumina has a band gap of 9.9 eV and these values classify these materials as insulators.

With respect to nanophosphors, the barrier coating material must be of a wider band gap than the phosphor material, if the higher phosphor efficiency is to be realized. The wider the band gap of the barrier coating material the more insulating it is, thereby increasing the probability of radiative recombination in the nanophosphors.

The barrier coating on nanophosphors should be continuous or hermetic coating since its function is also to protect the phosphor particle from a degrading atmosphere and to reduce or correct surface imperfections. A discontinuous coating will not protect a nanophosphor particle from a degrading atmosphere and it will not correct surface imperfections in areas on the particle where the coating is missing.

Providing the nonmetallic conductive coating, such as indium tin oxide, on a phosphor can be accomplished by any technique, such as the sol-gel process using indium methyl trimethyl acetyl acetate and tin isopropoxide. Since indium and tin alkoxides are not stable in presence of water, the reaction between the alkoxides is carried out in an anhydrous medium, such as isopropanol, which medium is distilled to remove water.

A stock solution of indium and tin precursor is made by mixing indium methyl trimethyl acetyl acetate, tin isopropoxide, and distilled isopropanol in a dry box. The resulting solution is purged with an inert gas to prevent water contamination.

The microphosphor particles in desired amount are dispersed in a distilled solvent for the coating to be carried out under an inert atmosphere. The indium tin alkoxide solution is added to the microphosphor dispersion under intert atmosphere. Water is then added for gelation of the indium tin oxide. The reactants are heated to a temperature below 100° C. to complete gelation.

The reaction contents are cooled and all the solvent is removed. Dried coated microphosphor particles are removed from the reaction flask and heat treated at an elevated temperature on the order of 450° C. for many hours to convert amorphous indium tin oxide coating to crystalline form. The coated microphosphor particles are then characterized by X-ray diffraction to determine the presence of crystalline indium tin oxide, then by scanning electron microscopy to determine the coating thickness and uniformity on the phosphor particles.

Solution chemistry can be used to provide a metallic conductive coating, such as gold, on a phosphor. Pursuant to this procedure, a sample of the crystalline ZnS:Ag microphosphors is dispersed in deionized water. A gold ($Au^{3+}$) ion solution is prepared by dissolving a chloroauric acid in cleionizied water. The $Au^{3+}$ ion solution is added dropwise to a reaction flask containing the phosphor suspension. After completing addition of the $Au^{3+}$ ion solution, the reaction contents of the flask are allowed to mix to allow for partial reduction of the metal compound on the phosphor surfaces. There may be a need to use a reducing solution, such as sodium sulfide in water, to reduce the metal. The reducing solution is then added dropwise to the flask to completely reduce the gold on the surface of the phosphor particles. Unreacted precursors and reaction byproducts are removed by repeated washing of the coated phosphor particles in deionized water and by centrifugation. After washing, the coated phosphor particles in powder form are dried and characterized by X-ray diffraction and electron microscopy. X-ray diffraction of the coated powder shows presence of the phosphor material and broad crystallization peaks from the gold coating. The crystallite size of the metal is determined from the diffraction peak width, which is confirmed by transmission electron microscope.

Pursuant to this invention, the nanophosphors have a hybrid coating thereon, i.e., a barrier layer and a conducting layer. A barrier layer of a wide band gap material is applied to the nanophosphors prior to application of the conducting layer, which is applied similarly to the application of the conductive coating on the microphoshors. The barrier layer can be applied by any technique including sol-gel process. Assuming a ZnS:Mn nanophosphor, preparation thereof can be commenced by preparing a $Zn^{2+}$ ion solution by dissolving an appropriate zinc compound in deionized water and a $Mn^{2+}$ ion solution by dissolving a manganese compound in deionized water. A small amount of the $Mn^{2+}$ ion solution is added to the $Zn^{2+}$ ion solution in a flask to provide a small amount of manganese in the phosphor. To the reaction flask, a sodium sulfide dissolved in dionized water is added dropwise with continuous stirring to form the ZnS:Mn nanocrystals. The crystals are formed in solution, washed, and separated by centrifugation. A capping agent can be used to reduce agglomeration of the nanoparticles. An X-ray diffraction pattern of the washed powders indicates presense of ZnS nanocrystals.

The nanophosphors produced as described above, are coated with a barrier layer of a wide band gap material by initially dispersing the nanophosphors in an inert medium in a flask and adding thereto a solution of the wide band gap precursor in solvent. The flask contents are stirred until all of the solvent is evaporated. Scanning electron micrograph of the nanophosphors provides not only the size of the phosphors but also the thickness of the barrier coating if a cluster of phosphors is separated revealing the area where separation occurred.

In making a conducting film embedded with phosphors, phosphor particles are dispersed in a conductive material precursor sol. When the embedded phosphors are microphosphors, the film thickness is about 1–20 microns whereas if the embedded phosphors are nanophosphors, the film thickness is about 10–5,000 nm. A mixture of phosphor particles can also be used. Thickness of the film should be such as to maximize light output. The film can be porous.

In the case of nanophosphors or microphosphors, a diffusion barrier can be provided before dispersing the particles in the conductive material precursor sol. If the microphosphor particles are unreactive, the barrier coating can be omitted. Once the particles are suspended in the sol, the solvent is only partially removed until an appropriate viscosity is observed for film making. Films can be made by dipping glass slides in the sol.

Figure 6:
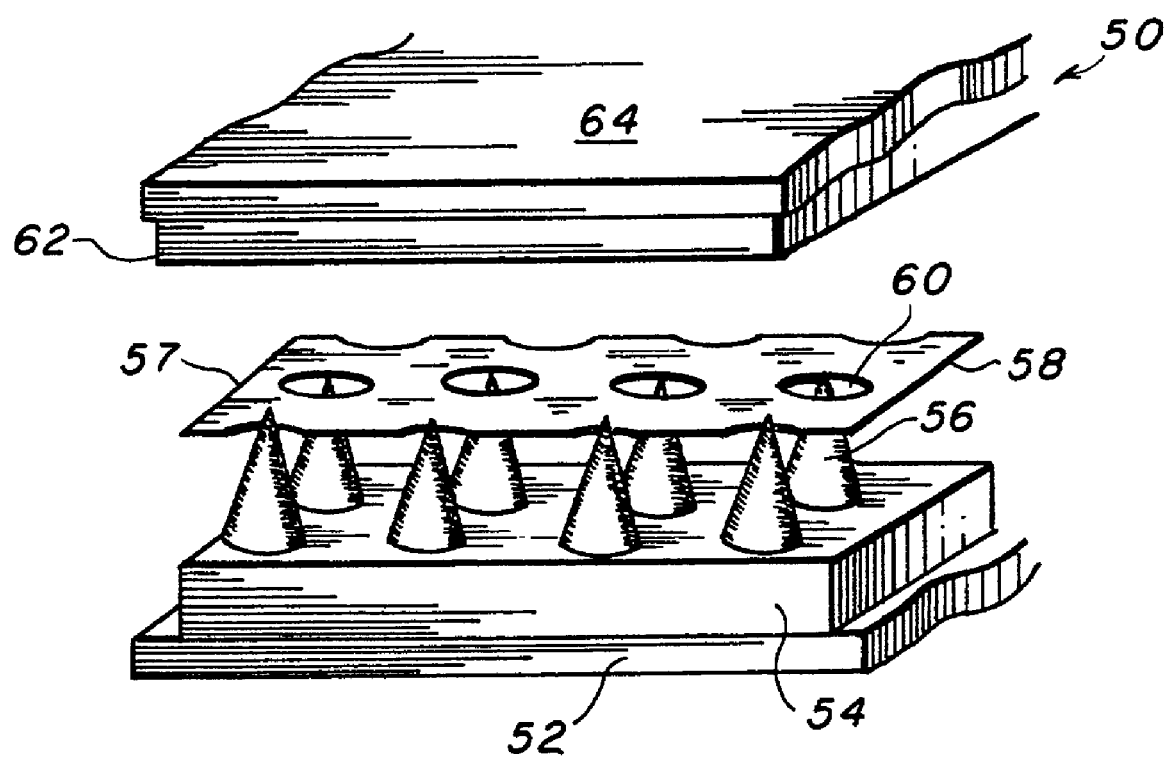
FIG. 6 is a simplified sketch of a field emission display device.

FIG. 6 is a simplified sketch of a field emission display device 50 showing substrate 52 on which is disposed and to which is attached resistive layer 54 and on the resistive layer are disposed a plurality of spaced cone-shaped microtips 56 each having apex 57 and being negatively biased. The microtips illustrated in FIG. 6 are disproportionately larger relative to the other elements illustrated therein. Gate 58 is disposed above the resistive layer 54 and has a plurality of spaced openings 60 therein which cradle apexes 57 of the microtips 56. Disposed above and spaced from gate 58, as viewed in FIG. 6, is the phosphor screen 62 which comprises a plurality of the phosphor particles referred to herein. The phosphor screen 62 is shown disposed below and associated with the glass plate 64. Under influence of electrical energy, electrons are emitted by the microtips 56 through their apexes 57 and strike the phosphor particles on phosphor screen 62 thus causing the phosphor particles to emit light.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

This example details the steps to make a 3 weight percent non-metallic indium tin oxide conducting coating on a microcrystalline ZnS phosphor.

The indium tin oxide coating was made using a sol-gel process with indium methyl trimethyl acetyl acetate and tin isopropoxide as the starting reagents. Since indium and tin alkoxides are not stable in the presence of water, the reaction was carried out in distilled isopropanol. A stock solution of indium and tin precursor was made by mixing 1.1 g of indium methyl trimethyl acetyl acetate, 0.056 g of tin isopropoxide, and 250 ml of distilled isopropanol in a dry box. The resulting solution is purged with an inert gas to prevent water contamination.

Separately, 1 g of ZnS:Ag,Cl (2–10 micron size particles) phosphor particles are dispersed in 570 ml of distilled isopropyl alcohol. 30 ml of the indium tin oxide precursor stock solution is added to the phosphor suspension under intert atmosphere. Water is then added with vigorous stirring. The reactants are heated to a temperature of about 90° C. to complete gelation of indium tin oxide to occur on the phosphor surface. The reaction contents are cooled and all the solvent is removed. Dried coated microphospor particles are removed from the reaction flask and heat treated at 450° C. in air for 2 hours to convert amorphous indium tin oxide coating to crystalline form.

Figure 2A:
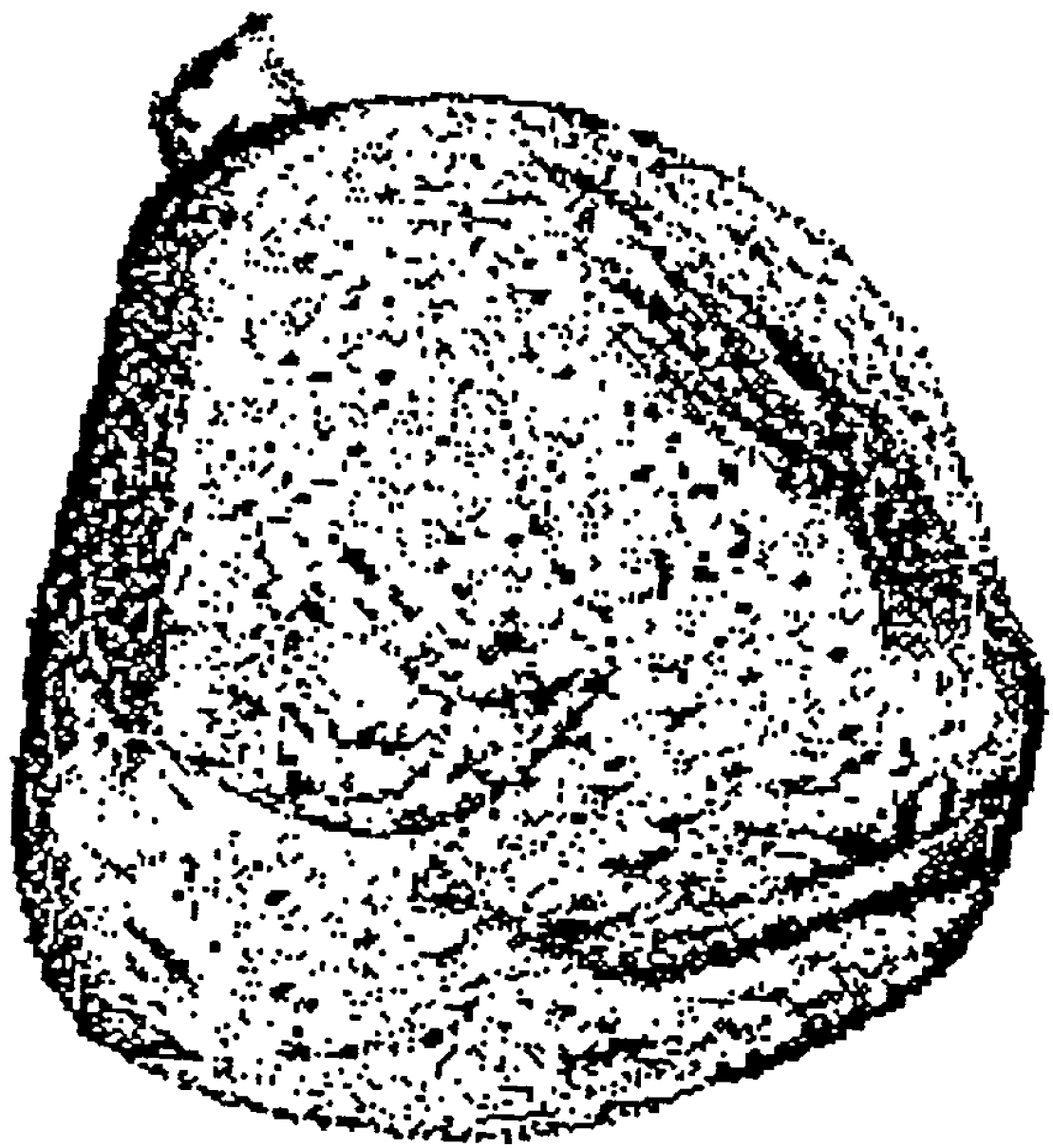
FIG. 2(a) shows a sketch of a secondary electron scanning electron microscope image of 5-micron diameter, generally rounded coated phosphor of Ex. 1.
Figure 2B:
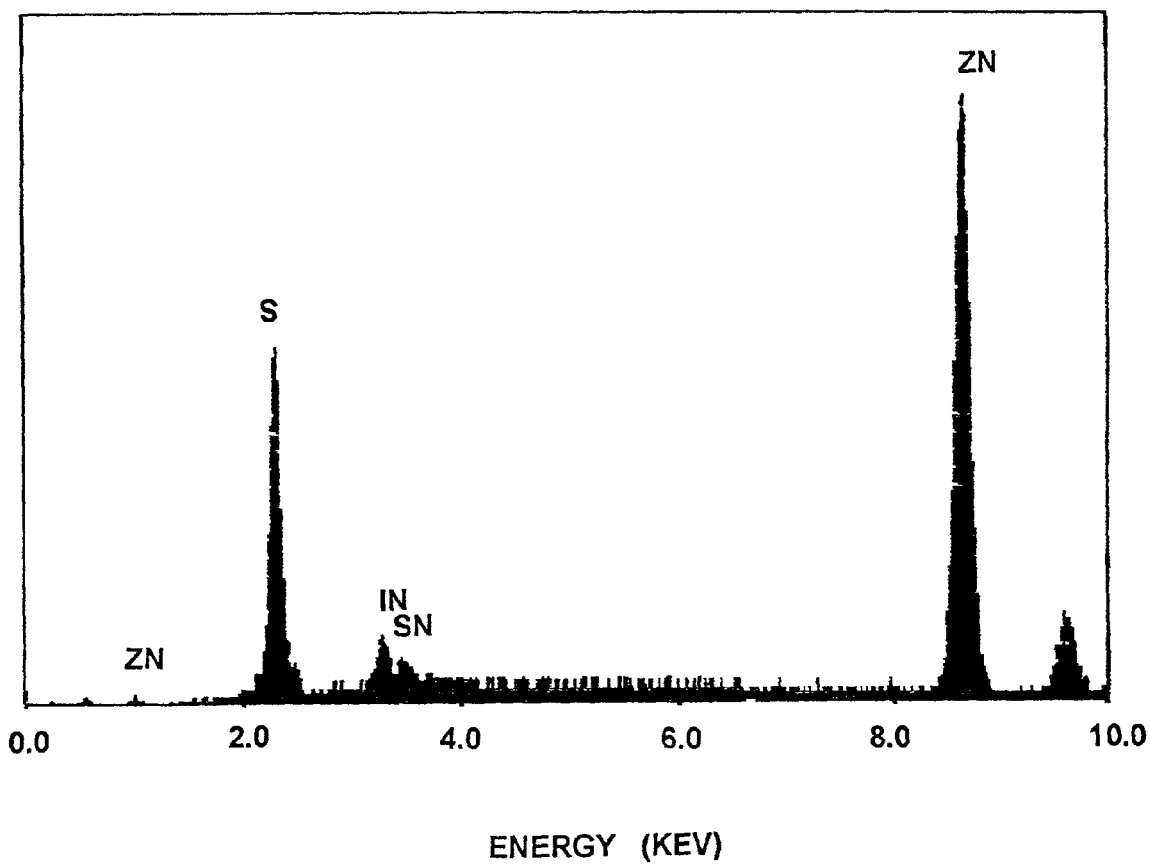
FIG. 2(b) shows the presence of the characteristic X-ray lines of zinc, sulfur, indium, and tin.

Indium tin oxide coated ZnS phosphor powder, having coating thickness of about 17 nm, was characterized by X-ray diffraction, scanning electron microscopy, and X-ray fluorescence. FIG. 1 shows the X-ray diffraction lines from ZnS phosphor coated with indium tin oxide. These lines are particularly evident for ZnS(10, 12, 14, 16, 18), and for $In_2O_3$ (12, 20). FIG. 2(*a*) shows a sketch of an SEM (secondary electron) image of the indium tin oxide coated ZnS phosphor at 2500× magnification. As shown by the SEM, the indium tin oxide formed a uniform coating on the phosphor surface. An energy dispersive spectrum of the sample in FIG. 2(*b*) shows the presence of characteristic X-ray diffraction lines of Zn at 22 and 30, of S at 24, of In at 26, and of Sn at 28.

EXAMPLE 2

This example details the steps to make conductive metallic gold (Au) coating on microcrystalline phosphor using solution chemistry.

0.2 grams of microcrystalline ZnS:Ag,Cl (blue) phosphor was dispersed in 200 ml of deionized water. A gold ($Au^{3+}$) ion solution was prepared by dissolving 0.0078 g of $HAuCl_4.3H_2O$ in 10 ml of deionized water. A sulfide ($S^{2-}$) ion solution was prepared by dissolving 0.24 g of $Na_2S.9H_2O$ in 40 ml of deionized water. The $Au^{3+}$-containing solution was added dropwise to the reaction flask containing the ZnS phosphor suspension. After complete addition, the reaction contents were allowed to mix for another 30 minutes to allow reduction of $Au^{3+}$ to $Au^0$ on the surface of ZnS. Unreacted precursors and isolated gold nanoparticles, if any, were removed by repeated washing in deionized water and centrifugation. After washing, the coated powders were dried and characterized by X-ray diffraction and electron microscopy.

Figure 3:
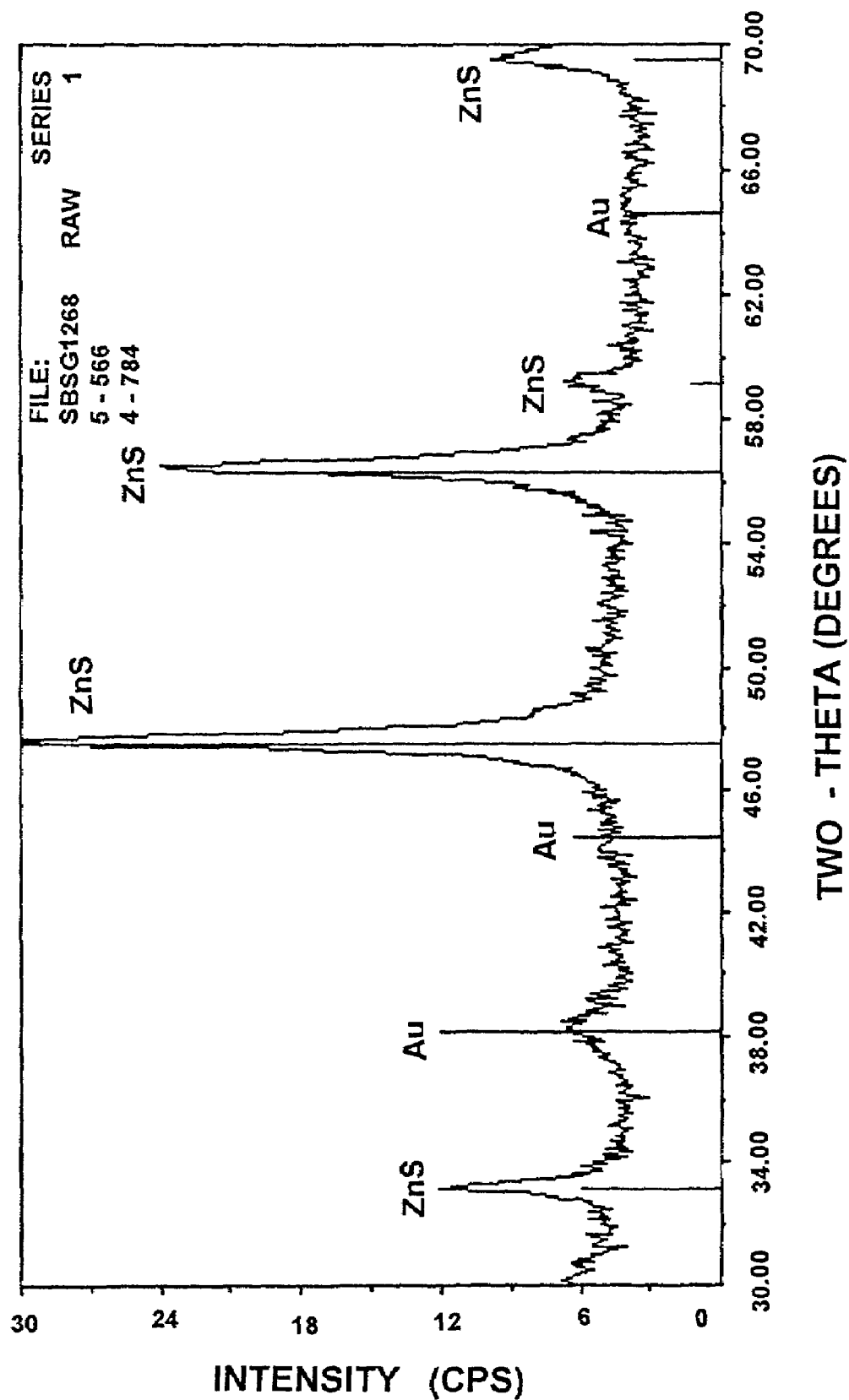
FIG. 3 is an X-ray diffraction pattern of the coated phosphors of Ex. 2 showing presence of zinc sulfide and broad crystalline diffraction peaks from gold.
Figure 4:
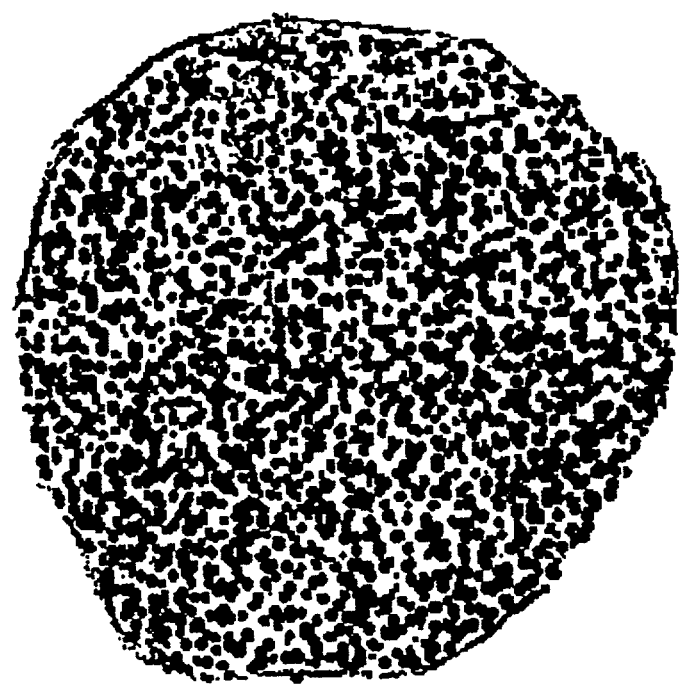
FIG. 4 is a sketch of a scanning electron microscope image of the phosphors of Ex. 2 and was used to confirm crystallite size of gold.

X-ray diffraction of the coated powder, having coating thickness of about 10 nm, showed the presence of ZnS and broad crystallization peaks from Au, as shown in FIG. 3. The crystallite size of gold was determined from the diffraction peak width and was estimated to be about 10 nm. This was confirmed by transmission electron microscope, as shown in FIG. 4.

EXAMPLE 3

This example details the steps to coat a microcrystalline ZnS:Mn phosphor with wide bandgap $SiO_2$ via sol-gel process.

Pursuant to the procedure, 1.0 g of ZnS microphosphors was dispersed in 200 ml of ethanol. 0.238 ml of partially hydrolyzed silica stock solution (obtained by mixing 122.0 ml of tetraethoxysilane, 122.0 ml of ethyl alcohol, 9.74 ml of deionized water and 0.4 ml of 1M HCl). This tetraethoxysilane solution was added dropwise to the ZnS suspension in ethyl alcohol. The contents were mixed in air until completely dry due to solvent evaporation. An approximately 10 nm thick silica coating on the ZnS particle was observed. The conductive coating was applied on dried silica-coated phosphor particles, as described in Ex. 1, above.

EXAMPLE 4

The hybrid nanophosphors were prepared in the identical manner described in Ex. 3, starting, of course, with nanophosphors

EXAMPLE 5

This example describes the steps to make conducting oxide films embedded with barrier coated nanocrystalline ZnS:Mn phosphors.

Figure 5:
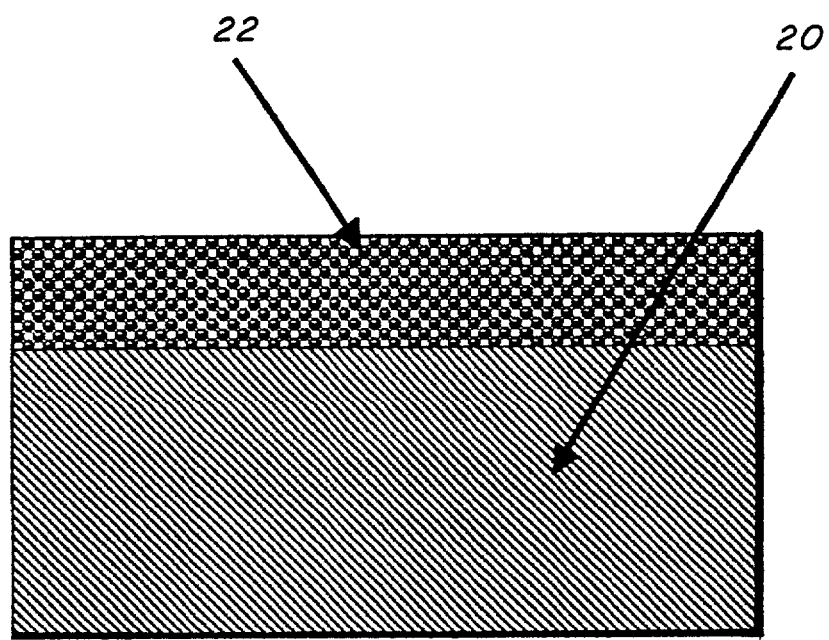
FIG. 5 is a diagram of indium tin oxide film with embedded nanophosphors of Ex. 4.

Nanocrystalline phosphor particles were coated with wide band gap silica, as discussed in Ex. 4. The dried $SiO_2$ coated particles were then dispersed in an indium tin oxide sol in a process similar to the one discussed in Ex. 1. In this case, ZnS constituted 50 weight percent of the composite. Solvent was only partially removed from the sol until a viscosity of about 200 cp was observed for film making. Films were made by dipping clean glass slides in the sol. A schematic of an indium tin oxide film 20 with embedded nanophosphors 22 is shown in FIG. 5.

EXAMPLE 6

This example briefly describes the steps to make conducting indium tin oxide films containing embedded therein new high efficiency SrS:Ce microphosphors. The coating process was the same as described in Example 5.

EXAMPLE 7

This example briefly describes the steps to make hybrid coating on new high efficiency SrS:Ce microphosphors. The hybrid coating was formed as described in Example 3.

While presently preferred embodiments have been shown of the novel coatings on phosphors, and of the several modifications discussed, persons skilled in this art will readily appreciate that various additional changes and modifications may be made without departing from the spirit of the invention as defined and differentiated by the following claims.

What is claimed is:

1. Particles in powder form, when operating under accelerating voltages of 100–10,000 volts last in excess of 10,000 hours of continuous operation without losing 50% of its original brightness, for use as a phosphor, each particle comprising (a) a non-oxide and single phase emitting material that can emit visible light in response to direct excitation caused by electrons operating at low voltage, and (b) an electrically conducting, visible light transmitting coating material disposed on said emitting material to provide an electrical pathway across said particle.

2. The particles of claim 1 wherein said particles are selected from the group consisting of microparticles, nanoparticles, and mixtures thereof, and thickness of said conductive material is 0.5–50 nm.

3. The particles of claim 1 wherein size of said particles is selected from the group consisting of 0.5–20 microns and 0.5–20 nm, and thickness of said conducting material is 1–10 nm.

4. The particles of claim 2 including an electrically nonconducting barrier material disposed on said emitting material beneath said conducting material, wherein size of said particles is selected from the group consisting of 1–10 microns and 1–10 nm.

5. The particles of claim 4 wherein said barrier material is disposed beneath said conducting material, said barrier material has thickness of 0.5–50 nm.

6. The particles of claim 5 wherein said conducting material forms a continuous coating on each of said particles and said barrier material has thickness of 1–10 nm.

7. The particles of claim 5 wherein said emitting material is selected from the group consisting of ZnS:Ag,Cl, ZnS:Mn, ZnS:Cu, thiogallates, SrS:Ce, SrS:Eu, and mixtures thereof; wherein said barrier material is selected from the group consisting of silica, magnesia, alumina and mixtures thereof; and wherein said conducting material is selected from the group consisting of silver, gold, palladium, zinc, indium, aluminum, indium oxide, tin oxide, indium tin oxide, zinc oxide, and mixtures thereof.

8. An electrically conducting film comprising a matrix and particles of claim 1 dispersed in said matrix.

9. The film of claim 8 wherein said matrix comprises an oxide.

10. The film of claim 9 wherein said matrix is selected from the group consisting of indium oxide, tin oxide, zinc oxide, indium tin oxide, and mixtures thereof; size of said particle is 0.5–20 nm; and said emitting material is selected from the group consisting of ZnS:Ag,Cl, ZnS:Mn, ZnS:Cu, thiogallates, SrS:Ce, SrS:Eu, and mixtures thereof.

11. The film of claim 10 wherein each of said particles is coated with a barrier material selected from the group consisting of silica, magnesia, alumina, and mixtures thereof.

12. The film of claim 11 having thickness of 1–20 microns when the embedded phosphors are microphosphors and the film thickness is about 10–5,000 nm when the embedded phosphors are nanophosphors.

13. A field emission device comprising a phosphor screen, electron field emitters spaced from said phosphor screen, and an electrical source for imparting sufficient electrical power to cause electrons to move from said field emitters toward said phosphor screen whereby light emission takes place on direct excitation of said phosphor screen by the electrons emanating from said field emitters, said phosphor screen comprising a plurality of precoated phosphor particles of claim 1.

14. The device of claim 13 wherein said electrical source imparts a low voltage differential between said field emitters and said phosphor screen.

15. The device of claim 14 wherein size of said phosphor particles is selected from the group consisting of microparticles, nanoparticles, and mixtures thereof, and thickness of said conducting material disposed on said particles is 0.5–50 nm.

16. The device of claim 14 wherein size of said phosphor particles is selected from the group consisting of 0.5–20 microns and 0.5–20 nm, wherein thickness of said conducting material disposed on said particles is 1–10 nm, and wherein the light emission is that of visible light.

17. The device of claim 15 wherein said phosphor particles include an electrically nonconducting barrier material below said conducting material and wherein size of said phosphor particles is selected from the group consisting of 1–10 microns and 1–10 nm.

18. The device of claim 17 wherein said barrier material has a wide band and its thickness is 1–10 nm.

19. The device of claim 18 wherein said emitting material is selected from the group consisting of ZnS:Ag, Cl, ZnS:Mn, ZnS:Cu, thiogallates, and mixtures thereof; wherein said conducting material is selected from the group consisting of silver, gold, palladium, zinc, indium, aluminum, zinc oxide, indium tin oxide, indium oxide, tin oxide, and mixtures thereof; and wherein said barrier material is selected from the group consisting of silica, alumina, magnesia, and mixtures thereof.

20. The device of claim 19 wherein said electrical source imparts a voltage differential of 100–10,000 volts between said field emitters and said phosphor screen.

* * * * *

UNITED STATES PATENT AND TRADEMARK OFFICE
CERTIFICATE OF CORRECTION

PATENT NO. : 7,173,367 B2 Page 1 of 1
APPLICATION NO. : 09/755375
DATED : February 6, 2007
INVENTOR(S) : Sanghera et al.

It is certified that error appears in the above-identified patent and that said Letters Patent is hereby corrected as shown below:

On Title Page Item [75] Insert
Inventors: Jasbinder S. Sanghera, Greenbelt, MD (US); Ishwar D. Aggarwal, Springfield, VA (US); Shyam S. Bayya, Falls Church, VA (US); Cathy S. Scotto, Montclair, VA (US); David T. Schaafsma, Vista, CA (US); Guillermo Villalobos, Alexandria, VA (US)

Signed and Sealed this

Sixth Day of November, 2007

JON W. DUDAS
*Director of the United States Patent and Trademark Office*